Oct. 2, 1956            C. GERST            2,764,898
TRANSMISSION
Filed Dec. 21, 1953                                2 Sheets-Sheet 1
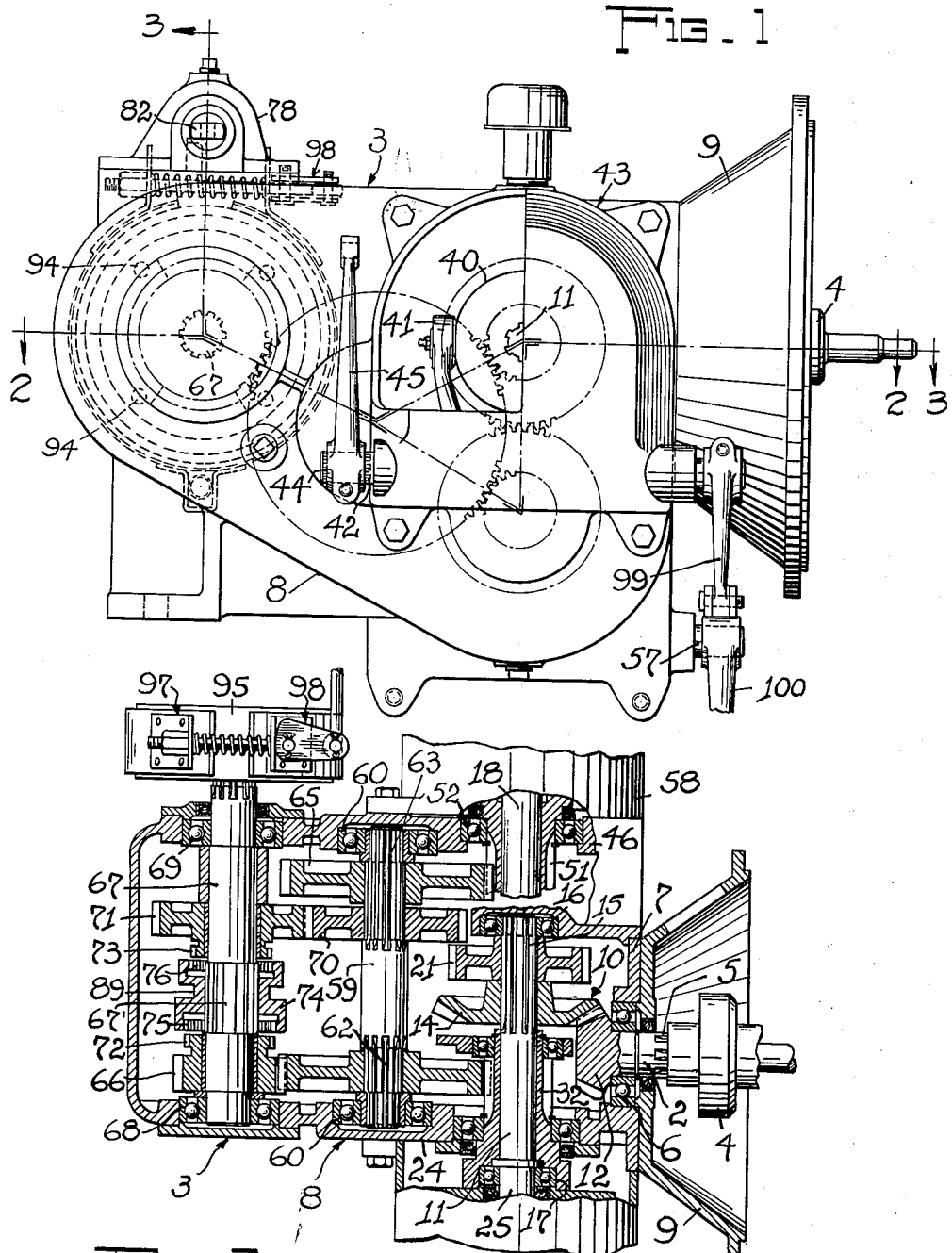
INVENTOR.
CHRIS GERST
BY
*Gustav A. Loeff*
ATT.

Oct. 2, 1956 C. GERST 2,764,898
TRANSMISSION
Filed Dec. 21, 1953 2 Sheets-Sheet 2
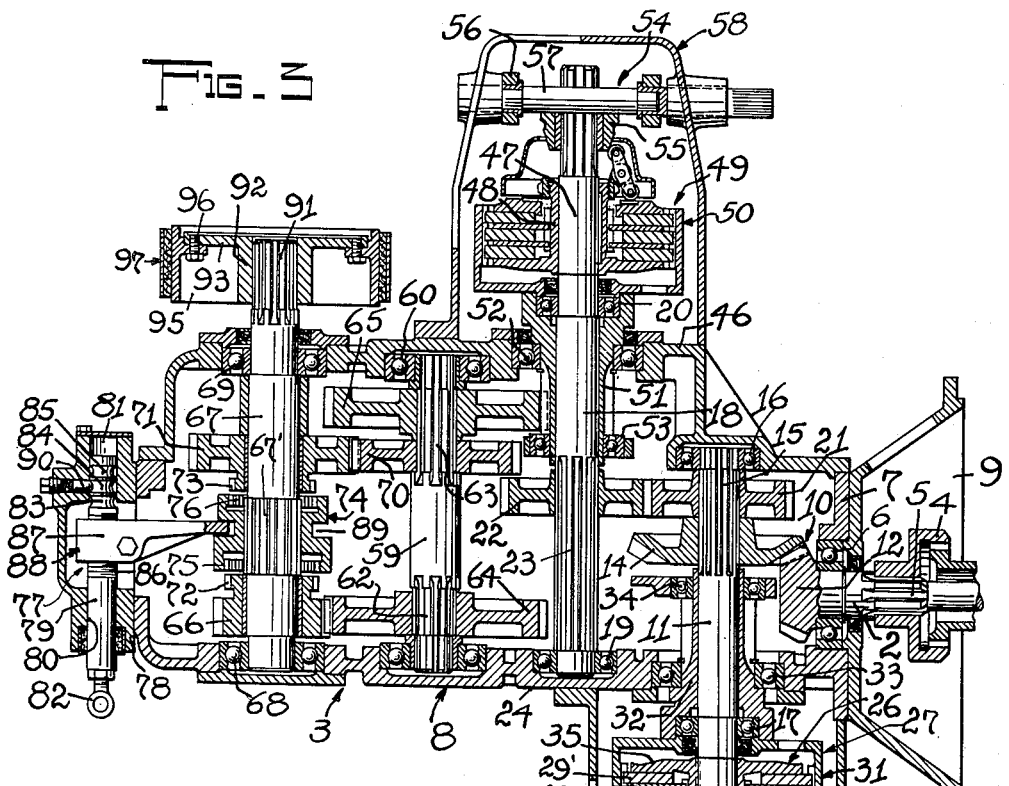
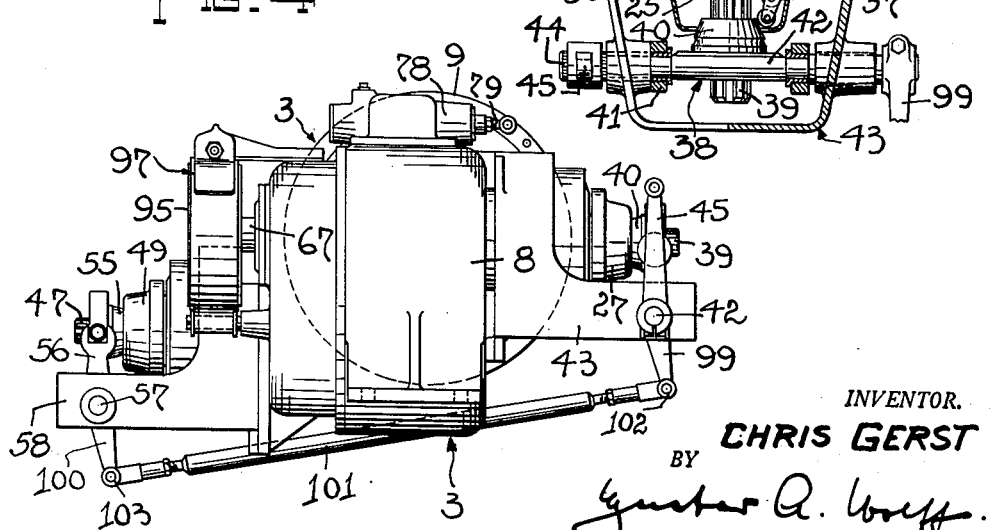
INVENTOR.
CHRIS GERST
BY
*Gustav A. Wolff*
ATT.

United States Patent Office 2,764,898
Patented Oct. 2, 1956

2,764,898

TRANSMISSION

Chris Gerst, Detroit, Mich., assignor to The Transmission & Gear Company, Dearborn, Mich., a corporation of Michigan Application December 21, 1953, Serial No. 399,223

9 Claims. (Cl. 74—360)

This invention relates in general to reduction transmissions and, more particularly, is directed to improvements in transmissions for heavy duty road machinery, marine use, etc., although not limited to any particular application.

The primary object of the invention is the provision of a simple, compact, multi-speed, reversible transmission embodying a plurality of individual, jointly controlled friction clutch means geared to each other and to the output shaft of the transmission to effect without shifting of gears selective forward and reverse rotation of such output shaft.

Another object of the invention is the provision of a simple, compact, reversible transmission embodying a plurality of jointly controlled, individually arranged friction clutches geared to each other and coupled by individual gearings with the output shaft of the transmission to effect without shifting of gears selective forward and reverse rotation of such output shaft.

A further object of the invention is the provision of a multi-speed transmission embodying a plurality of jointly controlled, individual friction clutches with driving members mounted on parallelly arranged, coordinated shafts geared to each other and driven members coupled by individual gearings with the output shaft of the transmission to effect without shifting of gears selective forward and reverse rotation of such output shaft.

Still another object of the invention is the provision of a multi-speed transmission embodying a plurality of jointly controlled, individual friction clutches with driving members mounted on parallelly arranged, coordinated shafts geared to each other for rotation in opposite directions and driven members individually geared to a countershaft to effect without shifting of gears selective forward and reverse rotation of the countershaft, and, in addition, including shiftable multi-speed gearing coupling the countershaft with the output shaft of the transmission to selectively rotate the output shaft in forward and reverse rotation at multiple speeds.

Still further objects and novel features of construction, combination and relation of parts by which the objects in view have been attained, will appear and are set forth in detail in the course of the following specification. The drawings accompanying and forming part of the specification illustrate a certain practical embodiment of the invention, but it will be apparent as the specification proceeds that the structure may be modified and changed in various ways without departure from the true spirit and broad scope of the invention.

In the drawings:

Fig. 1 is a side-view of a multi-speed transmission embodying the invention;

Fig. 2 is a sectional view through the transmission taken on line 2—2 of Fig. 1;

Fig. 3 is a sectional view through the transmission taken on line 3—3 of Fig. 1; and Fig. 4 is a front view of the transmission.

Referring now more particularly to the exemplified form of the invention shown in the drawings, input shaft 2 of a multi-speed, forward and reverse reduction transmission 3 is connected by a coupling 4 to an engine (not shown). Coupling 4 is mounted on the splined portion 5 of the input shaft which is journaled by means of ball bearing 6 in wall 7 of gear housing 8 and encircled by a bell housing 9 attached to said wall. The thus supported input shaft is coupled by bevel gearing 10 with a main shaft 11 angularly related to said input shaft, bevel gearing 10 including a bevel pinion 12 at the inner end of input shaft 2 and a bevel gear 14 mounted on splined portion 15 of main shaft 11, which bevel gear 14 meshes with bevel pinion 12. Main shaft 11, which is journaled in gear housing 8 by means of ball bearings 16 and 17, is directly permanently geared to a countershaft 18 arranged below said main shaft and journaled in gear housing 8 by means of ball bearings 19 and 20. For such purpose main shaft 11 has mounted on its splined portion 15 adjacent to bevel gear 14 a spiral gear 21 meshing with a spiral gear 22 on splined portion 23 of countershaft 18 to effect by rotation of input shaft 2 rotation of main shaft 11 and countershaft 18 in opposite directions with respect to each other.

Main shaft 11 extends outside of gear housing 8 through side wall 24 and rigidly mounts on extended portion 25 the driving clutch member 26 of a clutch structure 27, which driving clutch member includes a hug portion 28 non-rotatably and laterally shiftably supporting friction disks 29. These friction disks are arranged between other friction disks 29' non-rotatably and laterally shiftably supported on the internally splined circumferential flange 30 of a driven clutch member 31 of clutch structure 27, which driven clutch member has rigidly secured thereto a tubular spiral gear 32 freely rotatably mounted in ball bearings 33, 34 and arranged in axial alignment with main shaft 11. Friction disks 29 and 29' are brought into frictional driving engagement with each other when clamped between backing plate 35 on hub portion 28 of driving clutch member 26 and a shiftable pressure plate 36 to be shifted by dual clutch lever means 37 actuated by a shifting member 38 which is slidably mounted on the splined end portion 39 of main shaft 11 and coupled with a throwout collar 40 actuated by a fork 41 on a pivot shaft 42 which is mounted in a bracket 43 attached to wall 24 and supports on its exposed end 44 an operating lever 45.

Countershaft 18, which is permanently geared to main shaft 11, extends outside of gear housing 8 through side wall 46 arranged opposite to side wall 24. This countershaft rigidly mounts on its extended portion 47 a driving clutch member 48 of a clutch structure 49 which is constructed similar to clutch structure 27 and therefore not described in detail. Clutch structure 49 has its driven clutch member 50 secured to a tubular spiral gear 51 which is arranged in axial alignment with countershaft 18 and freely rotatably mounted in ball bearings 52, 53. The clutch structure is actuated by a shifting member 54 slidably mounted on the splined end portion of countershaft 18 and coupled with a throwout collar 55 which is actuated by a fork 56 on a pivot shaft 57 which is mounted in a bracket 58 attached to wall 46.

Driven clutch members 31 and 48 of clutch structure 27 and 49, respectively, are geared by their respective tubular spiral gears 32 and 51 to a second countershaft 59 journaled in gear housing 8 by means of all bearings 60, 61. For such purpose the second countershaft 59 has mounted on its splined portions 62 and 63 two large spiral gears 64, 65, respectively, which mesh with the tubular spiral gears 32 and 51. Spiral gear 64 meshes with tubular spiral gear 32 and a small spiral gear 66 freely rotatably mounted on output shaft 67 journaled in gear housing 8 by means of ball bearings 68, 69 and spiral gear 65 meshes with tubular spiral gear 51 on countershaft 18. The second countershaft 59 additionally mounts on splined portion 63 a spiral gear 70 which is smaller than spiral gear 65 and in mesh with a large spiral gear 71 freely rotatably mounted on output shaft 67. The two freely rotatably mounted spiral gears 66 and 71 on output shaft 67 each include clutch portions 72, 73, respectively, adapted to cooperate with a clutch sleeve 74 slidably and non-rotatably mounted on splined portion 67' of output shaft 67 for selective coupling of said output shaft with either one of the two spiral gears 66 and 71. Clutch sleeve 74, which includes at its opposite ends clutch portions 75, 76 cooperating in clutching operations with the clutching portions 72, 73 on spiral gears 66, 71 respectively, is actuated by a shifting mechanism 77 arranged in a gear housing section 78. This shifting mechanism embodies a shifting rod or bar 79 slidably and axially rotatably supported in bores 80 and 81 of gear housing section 78 for parallel movement with respect to output shaft 67. Shifting rod 79 is provided at one end with an adjustably attached eye bolt 82 and near its other end with three laterally spaced circumferential, round grooves 83, 84 and 85 and in addition includes a threaded portion 86 threadedly engaged with and clamped to the threaded split hub 87 of a shifting fork 88 which engages a peripheral groove 89 in clutch sleeve 74. The shifting rod 79 is extended with its eye bolt supporting end outside of gear housing section 78 for actuation by lever mechanism (not shown) and is controlled by a spring-pressed plunger 90 which cooperates with the grooves 83, 84 and 85 to properly locate and hold clutch sleeve 74 in locking engagement with spiral gear 66, spiral gear 71 or in neutral position.

Output shaft 67 is extended outside of gear housing 8 and supports on its exposed splined end 91 a flanged coupling member 92, including in its disk-like flange 93 a plurality of bores 94 (see Fig. 1) to permit coupling of the output shaft with a device to be driven. In addition, disk-like flange 93 mounts a brake drum 95 which is attached to said flange by bolts 96 and cooperates with a split brake band arrangement 97 supported on gear housing 8 and actuated by cam mechanism 98 as commonly practiced.

The thus constructed multi-speed reduction transmission has two forward and two reverse speeds controlled by clutch structures 27 and 49 coupled with each other for individual action to activate either one of the clutch structures when the respective other one of such clutch structures is inactivated. For such purpose clutch structures 27 and 49 have mounted on their pivot shafts 42 and 57 lever arms 99, 100, respectively, which are coupled with each other by a longitudinally adjustable link member 101 pivoted at its opposite ends 102 and 103 to lever arms 99, 100. The described coupling of pivot shafts 42 and 57 prevents simultaneous actuation of the two clutch structures 27 and 49 and thus permits proper rotation of output shaft 67 in forward and reverse rotation depending upon activation of either clutch structure 27 or clutch structure 49. Forward and reverse rotation of output shaft 67 at different speeds is effected by shifting clutch sleeve 74 to engage with clutch portions 75 the clutch portion 72 on spiral gear 66 or engage with clutch portions 76 the clutch portion 73 on spiral gear 71.

Having thus described my invention, what I claim is:

1. In a transmission a main drive shaft continuously rotated in the same direction, an output shaft, a forward gear train and a reverse gear train, said gear trains selectively coupling said main drive shaft with said output shaft, said gear trains including a first countershaft permanently geared to said main drive shaft, a second countershaft adapted to be selectively geared to said output shaft, gear means freely rotatably mounted on said main drive shaft and said first countershaft said gear means being geared to said second countershaft, clutch means on said main drive shaft adapted to selectively couple the main drive shaft with the gear means rotatably mounted thereon and other clutch means on the first countershaft adapted to selectively couple the first countershaft with the gear means rotatably mounted thereon.

2. In a reversible transmission a main drive shaft, an output shaft, and a plurality of gear trains coupling said main shaft with said output shaft, said gear trains including a gear rotatably mounted on said main drive shaft, a first clutch means adapted to selectively couple said main drive shaft with said gear, a first countershaft geared to said main drive shaft to be rotated thereby in a direction opposite to the direction of rotation of said main drive shaft, a gear rotatably mounted on said first countershaft, a second clutch means adapted to selectively couple the first countershaft with the gear rotatably mounted thereon, a second countershaft having mounted thereon gears meshing the gears rotatably mounted on said main drive shaft and said first countershaft, gears freely rotatably mounted on the output shaft, said latter gears arranged in continuous mesh with the gears mounted on said main drive shaft and said second countershaft, and axially shiftable coupling means nonrotatably mounted on the output shaft adapted to selectively couple same with the gears rotatably mounted thereon.

3. In a transmission a housing, a main drive shaft journaled in said housing extended outside thereof through one of its walls, a first countershaft journaled in said housing extended outside thereof through another one of its walls opposite to said one wall, gears on said main drive shaft and said first countershaft arranged in mesh with each other adapted to effect rotation of the main drive shaft and first countershaft in opposite directions with respect to each other, gears rotatably mounted on the main drive shaft and the first countershaft, clutch means on the outer portions of the main drive shaft and first countershaft adapted to selectively couple these shafts with the gears mounted thereon, an output shaft journaled in said housing, gears rotatably mounted on the output shaft adapted to be selectively coupled therewith, a second countershaft, and gears rigidly mounted on said second countershaft and in mesh with the gears on the main drive shaft, the first countershaft and the output shaft.

4. A transmission as described in claim 3, wherein the clutch means on the main drive shaft and first countershaft each include shiftable actuating means of substantially the same construction, and wherein these actuating means are linked to each other to effect joint shifting of the clutch means and prevent their simultaneous activation.

5. A transmission as described in claim 3, wherein the clutch means on the main drive shaft and first countershaft are friction clutch means, wherein each of said clutch means includes a shiftable actuating member actuated by a lever arrangement, wherein the lever arrangements are pivotally supported on brackets attached to the said walls of the housing, and wherein said lever arrangements are connected with each other by a link member to effect joint shifting of the clutch means and prevent their simultaneous activation.

6. In a reversible transmission a housing, a main drive shaft continuously driven in the same direction, a countershaft permanently geared to said main drive shaft to be rotated in an opposite direction with respect thereto, an output shaft, a forward gear train and a reverse gear train, said gear trains selectively coupling the main drive shaft to the output shaft for forward and reverse rotation of the output shaft, said main drive shaft and countershaft having their one ends extended in opposite directions outside of said housing through opposed walls thereof and rotatably mounting inside of the housing gears of said forward and reverse gear trains and outside of the housing clutch means adapted to control coupling of said gears to said main drive shaft and said countershaft, actuating means for the clutch means and link means connecting the actuating means with each other to prevent simultaneous activation of the clutch means.

7. In a reversible transmission a housing, an input shaft journaled in said housing, a forward clutch shaft, a reverse clutch shaft, said clutch shafts journaled in said housing in parallel relation to each other and having their one ends extended in opposite directions outside of said housing through opposed side walls thereof, said forward and reverse clutch shafts being permanently directly geared to each other and the forward clutch shaft being permanently directly geared to said input shaft, an output shaft journaled in said housing and forward and reverse gear trains selectively coupling said forward and reverse clutch shafts with said output shaft, the forward gear train including a gear freely rotatably mounted on the forward clutch shaft and a clutch structure mounted on the extended end of said forward clutch shaft adapted to selectively couple said gear with said one clutch shaft, the reverse gear train including a gear freely rotatably mounted on the reverse clutch shaft and a clutch structure mounted on the extended end of the reverse clutch shaft adapted to selectively couple the last named gear with the said other clutch shaft, an individual actuating means for each one of said two clutch structures and longitudinally adjustable link means coupling said individual clutch actuating means with each other to prevent simultaneous activation of the two clutch structures.

8. A reversible transmission as described in claim 7, wherein the actuating means for said clutch structures are mounted on brackets attached to the said opposite walls through which the said one ends of the forward and reverse clutch shafts are extended.

9. A reversible transmission as described in claim 7, wherein the input shaft is angularly related to said clutch shafts and said output shaft, and wherein said housing supports one of said side walls a brake structure having a brake drum arrangement rigidly mounted on the outwardly exposed end of the output shaft.

References Cited in the file of this patent
UNITED STATES PATENTS

| | | |
|---|---|---|
| 1,827,582 | Jacobs | Oct. 13, 1931 |
| 2,081,846 | Behrens | May 25, 1937 |
| 2,134,109 | Eckert | Oct. 25, 1938 |
| 2,304,032 | Schmitter | Dec. 1, 1942 |
| 2,443,313 | Gerst | June 15, 1948 |